(No Model.)
N. H. LONG.
RAIN WATER FILTER.
No. 249,538. Patented Nov. 15, 1881.
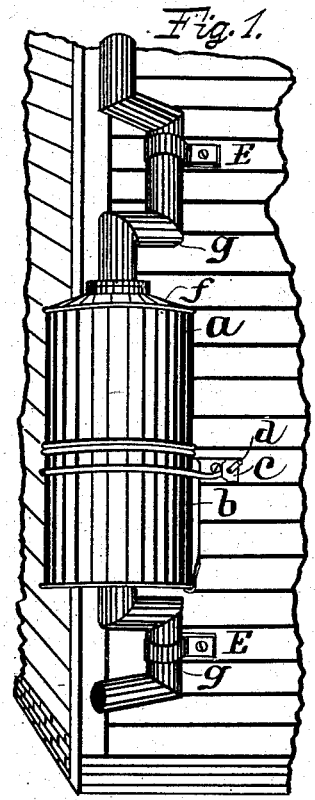
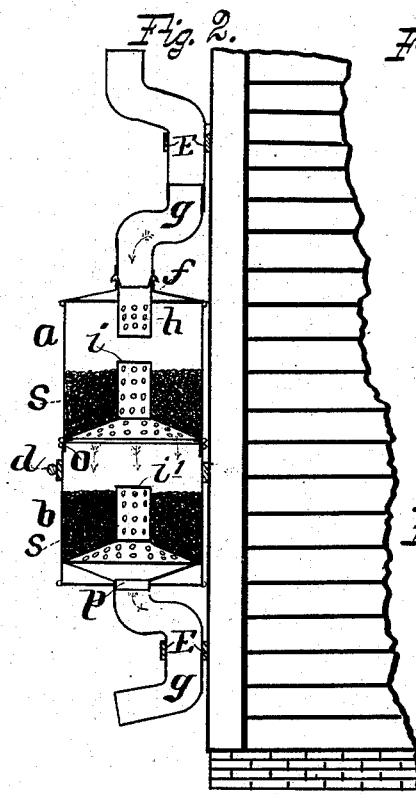
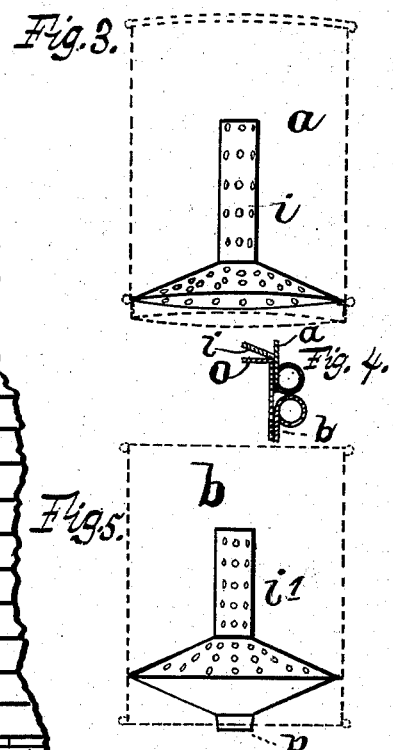
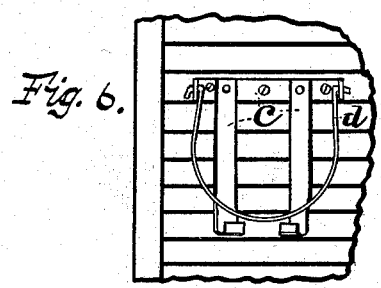
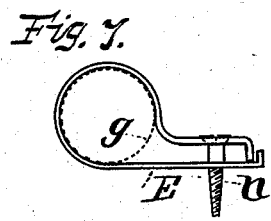
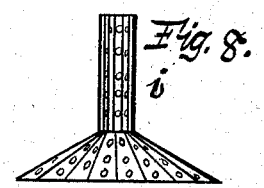
Witnesses:
C. E. Adamson
J. Shaw
N. H. Long,
Inventor:
per
C. E. Adamson,
Atty.

UNITED STATES PATENT OFFICE.

NATHAN H. LONG, OF MUNCIE, INDIANA, ASSIGNOR OF ONE-HALF TO JOSEPH SHAW, OF SAME PLACE.

RAIN-WATER FILTER.

SPECIFICATION forming part of Letters Patent No. 249,538, dated November 15, 1881.

Application filed June 16, 1881. (No model.)

To all whom it may concern:

Be it known that I, NATHAN H. LONG, a citizen of the United States, residing at Muncie, in the county of Delaware and State of Indiana, have invented a new and useful Rain-Water Filter, of which the following is a specification.

My invention relates to improvements in rain-water filters; and the objects of my improvements are, first, to provide a simple detachable rain-water filter that can be hung vertically to the side or end of any house or other building or placed over a cistern; second, to arrange a filter that can be easily and quickly taken apart and cleaned and refilled with filtering materials; third, to arrange fastening and hanging devices for supporting and hanging the filter; fourth, to have removable disks under the filtering substances, so that the water will fall from one to the other and pass out at the bottom of the filter through the concaved bottom and spout. I attain these objects by the mechanism illustrated in the accompanying drawings, in which—

Figure 1 is a perspective view of the filter in use. Fig. 2 is a vertical section of the same. Fig. 3 is a view of the upper perforated disk, the broken lines showing the upper section of the filter. Fig. 4 is an enlarged view of the lower edge of the top section and top edge of the lower section of the filter. Fig. 5 is a similar view to Fig. 3. Figs. 6 and 7 are forms of fastening and hanging devices. Fig. 8 is a view of the perforated disks.

Similar letters refer to similar parts throughout the several views.

The hangers E E, pipe $g$, lid $f$, upper section, $a$, band or rod $d$, bracket $c$, and lower section, $b$, constitute the exterior parts of my filter.

The upper section, $a$, has a lid, $f$, on its upper end. In this lid the strainer $h$ is placed, so as to receive the end of the spout $g$, as shown at Fig. 2.

The lower inner edge of section $a$ has an inward-turned flange, $o$, soldered to it, as shown at Fig. 4, for supporting the upper perforated disk, $i$, and the weight of the filtering substance $s$. The said disk $i$ consists of a short perforated pipe and a large outward flanged perforated rim or bottom, as shown in Fig. 8.

The upper section, $a$, is filled with charcoal and other filtering substances, as shown in Fig. 2.

The lower part of the flange $o$ extends down in section $b$ to prevent it from slipping off, as shown at Fig. 4, but it can be removed by raising it up.

The perforated disk $i'$ rests on the concaved bottom of section $b$, as shown in Figs. 2 and 5, and the said section is filled with filtering materials similar to section $a$.

The lower part of the concaved bottom of section $b$ has a spout or rim, P, for the reception of spout $g$, as shown.

The band or wire $d$ is placed around the upper part of section $b$ for clamping and holding the filter to the bracket, which is attached by screws to the side or end of any house, as shown in Fig. 6.

The filter is placed on the hooks of the bracket at $c$ and the band or wire $d$ is bent around it and hooked on each side, as shown in Figs. 1 and 6, and the weight of the pipes is held up by the clamps or hangers E, as shown in Fig. 1, and by turning the screws $n$ into the wood they clamp the hanger firmly around the pipe, as shown in Fig. 7.

When the filter is in use, as shown in Fig. 1, the water passes through the upper spout into the strainer $h$, which prevents any large particles from entering the filter. From the strainer the water falls on the filtering material of section $a$. Straining through that, it again falls down on the filtering material of section $b$. Soaking through that, it passes through the concaved bottom into the lower pipe, as shown. By the arrangement of the sections in two parts and the perforated disks, as shown and described, the water from the spout is passed freely to the cistern or reservoir below. One long section may be used, but I prefer two.

Having thus described my invention, what I claim, and desire to secure by Letters Patent, is—

1. In a rain-water filter, the combination of the disks $i\ i'$, flanged rim $o$, and sections $a$ and $b$ with the spout $g$, for the purpose set forth.

2. The combinations of sections $a$ and $b$, lid $f$, having a strainer $h$, and spout $g$, with the perforated disks $i$ and $i'$ resting on the flange-rim $o$, and concaved bottom P, substantially as set forth.

3. In a rain-water filter, the combination of the hangers $c$, $d$, and E, with the pipe $g$ and sections $a$ and $b$, for the purpose set forth.

NATHAN H. LONG.

Witnesses:
 C. E. ADAMSON,
 THOMAS MITCHELL.